(12) United States Patent
Hass et al.

(10) Patent No.: US 11,279,121 B2
(45) Date of Patent: Mar. 22, 2022

(54) APPARATUS AND METHOD FOR FABRICATING LAMINATED WOOD PRODUCTS

(71) Applicant: RFSprotech, LLC, Matthews, NC (US)

(72) Inventors: Russell Gordon Hass, Matthews, NC (US); Karl Ogden, Charlotte, NC (US)

(73) Assignee: RFSPROTECH, LLC, Matthews, NC (US)

( * ) Notice: Subject to any disclaimer, the term of this patent is extended or adjusted under 35 U.S.C. 154(b) by 0 days.

(21) Appl. No.: 16/878,110

(22) Filed: May 19, 2020

(65) Prior Publication Data
US 2021/0362483 A1    Nov. 25, 2021

(51) Int. Cl.
*B32B 41/00* (2006.01)
*B32B 37/12* (2006.01)
*B32B 38/18* (2006.01)

(52) U.S. Cl.
CPC .............. *B32B 41/00* (2013.01); *B32B 37/12* (2013.01); *B32B 38/1858* (2013.01); *B32B 2317/16* (2013.01); *B32B 2419/04* (2013.01)

(58) Field of Classification Search
CPC ..... B32B 41/00; B32B 37/12; B32B 38/1858; B32B 2317/16; B32B 2419/04
See application file for complete search history.

(56) References Cited

U.S. PATENT DOCUMENTS

2016/0067879 A1*  3/2016  Capps, Jr. ............ B65H 3/0833
156/64

* cited by examiner

*Primary Examiner* — Vishal I Patel
(74) *Attorney, Agent, or Firm* — Shumaker, Loop & Kendrick, LLP

(57) ABSTRACT

An apparatus for forming a laminated product by positioning a veneer onto a substrate while on a moving conveyor, including an elongate conveyor having an infeed end, a downstream outfeed end and adapted for moving successive known lengths of substrates having an upper surface carrying an adhesive along a longitudinal axis from the infeed end to the outfeed end at a known rate. At least one veneer supply source is positioned in a known location laterally offset from the longitudinal axis of the conveyor for supplying successive lengths of veneer to be applied onto a top surface of the moving lengths of substrate. A related method of operating the apparatus is disclosed.

13 Claims, 6 Drawing Sheets

APPARATUS AND METHOD FOR FABRICATING LAMINATED WOOD PRODUCTS

TECHNICAL FIELD AND BACKGROUND OF THE INVENTION

The present invention provides an apparatus and method for automatically selecting and positioning laminates such as veneer during the composing process prior to laminating wood products, for example laminated wood flooring. As used in this application, the term "veneer" is used in a broad sense to mean any top or outer layer that is applied and bonded to a substrate, whether the veneer is wood or some other material. The term "substrate" is used in a broad sense to mean any layer below the veneer, whether a bottom layer or a "core" positioned under the veneer and above a bottom layer. The process of applying and bonding a veneer to a substrate as described in this application is sometimes referred to as "composing" a laminated wood product.

A commonly used method for producing laminated wood products involves bonding a thin veneer of wood, plastic or other substance to a thicker substrate. An aggressive adhesive is applied to the substrate and the veneer is then overlaid in registration with the substrate. Pressure is applied to the overlaid veneer and substrate to bond the components together, forming a unified structure.

In the case of engineered wood flooring, the substrate is normally plywood of a fixed length between 4 to 8 ft. (1.2-2.4 m) and the veneer is either a fixed or random length between 2 to 10 ft. (0.6-3 m). One method used to manufacture the flooring includes the steps of applying adhesive to the top of the substrate and then lining up the substrates together end to end on a continuously moving conveyor. Random lengths of veneer are then applied manually or mechanically on top of the substrate end to end and fed through a press to laminate the substrate to the veneer; resulting in a continuous web. A subsequent sawing operation is used to part the web at a joint between the lengths of veneer, resulting in laminated flooring components having a length that is the same as the fixed or random length of the individual veneers. The components are then subjected to machining on all 4 edges, resulting in a flooring product.

Unless controlled, the substrate seam can be at any location along the length of the veneer. Conventionally, the trailing edge of the veneer must be located at a minimum distance from the trailing edge of the underlying substrate. This insures a strong bond and solid end joints during the subsequent laminating and machining processes. If, when sawing the lengths of bonded substrate/veneer at the veneer joint, only a short piece of the substrate remains bonded at an end of the flooring product, the resulting product is weak at the end and subject to breakage. If this happens, that particular length of product is considered defective and is frequently discarded.

In current practice, the random length veneers are either composed manually by an operator, who selects the length of the veneer based upon substrate seam locations and then places the veneer onto the surface of the substrate. Ideally, the operator notes the location of the substrate seam and selects a length of veneer that insures a substantial distance between the trailing end of both the veneer and substrate. Alternatively, the veneers are loaded into hoppers and fed mechanically by feeders onto the substrate. These mechanical feeders are limited in their ability to create first quality laminations because the veneers cannot be selected individually. As with the manual manufacturing operation, a secondary operation of inspecting and rejecting products is necessary. These feeders also require uniformly dimensioned veneer with a thickness of 0.100" or greater or the feeding mechanisms are subject to jamming. There are also some wood product manufacturers who use low grade veneer with varying thicknesses, and these automatic feeders are not capable of properly feeding these veneers onto the substrate.

There is a need in the industry for an apparatus and method to automatically form laminates such as veneer with inconsistent thickness dimensions and varying lengths when manufacturing laminated wood products.

SUMMARY OF THE INVENTION

According to one aspect of the invention, an apparatus and method is provided to automatically position laminates such as veneer onto a substrate during manufacture.

According to another aspect of the invention, prior to laminating the veneer and substrate, a robot or other device selects veneer having a length such that when bonded to a substrate there is a substantial length of substrate between the end of the veneer and the end of the substrate.

According to another aspect of the invention, a vacuum gripper assembly is used to pick up and place veneer onto a traveling length of substrate.

According to another aspect of the invention, a scanner detects the substrate leading edges and the veneer trailing edges.

According to another aspect of the invention, an apparatus and method is provided that includes the ability to automatically select veneers of different lengths such that the seams of the substrates and the seams of the veneers are offset by a specified dimension.

According to another aspect of the invention, an apparatus and method is provided that includes a camera for detecting seams between substrates and/or the measurement of substrate length.

These and other aspects of the invention are achieved by providing an apparatus for forming a laminated product by positioning a veneer onto a substrate while on a moving conveyor, including an elongate conveyor having an infeed end, a downstream outfeed end and adapted for moving successive known lengths of substrates having an upper surface carrying an adhesive along a longitudinal axis from the infeed end to the outfeed end at a known rate. At least one veneer supply source is positioned in a known location laterally offset from the longitudinal axis of the conveyor for supplying successive lengths of veneer to be applied onto a top surface of the moving lengths of substrate. A seam location sensor is provided for determining the location of a seam between successive lengths of the substrate moving downstream. An end edge sensor is provided for determining the location of end edges of the moving lengths of substrate and veneer. A location monitor monitors the location of the seams and end edges as they move along the conveyor and a computer is programmed to calculate a moving position of a trailing end edge of a substrate moving on the conveyor based on inputs from the seam location sensor and the end edge sensor and location monitor determine an appropriate length of veneer necessary to position the seam of the substrate at a minimum distance from the end edges of the veneer. A robot is operatively connected to the computer and is adapted to remove from the veneer supply source a veneer having a length determined by the computer to position the seam of the substrate at a minimum distance from the end edges of the veneer, laterally transport the veneer into the longitudinal axis of the conveyor, apply a leading edge of the veneer to a trailing edge of preceding veneer and lower the veneer onto an upper surface of the substrate.

According to another embodiment of the invention, the robot includes a computer-controlled arm carrying an elongate gripping bar having a plurality of spaced-apart vacuum grippers programmed to utilize vacuum pressure to lift, transport and lower the veneer.

According to another embodiment of the invention, the seam location sensor includes a vision camera having a data output to the computer.

According to another embodiment of the invention, the end edge sensor includes a laser scanner having a data output to the computer.

According to another embodiment of the invention, the location monitor includes an encoder having a data output to the computer.

According to another embodiment of the invention, the veneer supply source comprises a plurality of elongate bins sized to hold veneers of varying specific lengths positioned in an array extending along and laterally-offset from the longitudinal axis of the conveyor, and the robot includes a computer-controlled arm carrying an elongate gripping bar having a plurality of spaced-apart grippers adapted to lift, transport and lower the veneer.

According to another embodiment of the invention, the computer is adapted to be programmed to direct the robot arm to select from a selected one of the veneer bins a specific length of veneer having a length determined by the computer to position the seam of the substrate at a minimum distance from the end edges of the veneer.

According to another embodiment of the invention, the robot includes a computer-controlled arm carrying an elongate gripping bar having a plurality of spaced-apart grippers adapted to remove a veneer from a selected bin, move the veneer laterally into the longitudinal axis of the conveyor at a position above and aligned with the moving substrate, accelerate the aligned veneer along the longitudinal axis of the conveyor and into a position where the gripping bar lowers the moving veneer into close proximity with a trailing end of a preceding veneer, and lower the moving veneer onto the moving substrate.

According to another embodiment of the invention, the computer is adapted to be programmed to direct the robot arm to select from one of the veneer bins a specific length of veneer having a length determined by the computer to position the seam of the substrate at a minimum distance from the end edges of the veneer.

According to another embodiment of the invention, a method of fabricating laminated wood products by positioning a veneer onto a substrate while on a moving conveyor is provided that includes the steps of providing an elongate conveyor having an infeed end, a downstream outfeed end and adapted for moving successive known lengths of substrates having an upper surface carrying an adhesive along a longitudinal axis from the infeed end to the outfeed end at a known rate, providing at least one veneer supply source positioned in a known location laterally offset from the longitudinal axis of the conveyor for supplying successive lengths of veneer to be applied onto a top surface of the moving lengths of substrate, determining the location of a seam between successive lengths of the substrate moving downstream, determining the location of end edges of the moving lengths of substrate and veneer, monitoring the location of the seams and end edges as they move along the conveyor, programming a computer to calculate a moving position of a trailing end edge of a substrate moving on the conveyor based on inputs from the seam location sensor, end edge sensor and location monitor and determine an appropriate length of veneer necessary to position the seam of the substrate at a minimum distance from the end edges of the veneer, providing a robot operatively connected to the computer, removing from the veneer supply source with the robot a veneer having a length determined by the computer to position the seam of the substrate at a minimum distance from the end edges of the veneer, laterally transporting with the robot the veneer into the longitudinal axis of the conveyor, applying a leading edge of the veneer with the robot to a trailing edge of a preceding veneer and lowering the veneer with the robot onto an upper surface of the substrate.

According to another embodiment of the invention, the method includes the step of utilizing vacuum pressure to lift, transport and lower the veneer.

According to another embodiment of the invention, the step of supplying at least one veneer supply source includes the step of providing a plurality of elongate bins sized to hold veneers of varying specific lengths positioned in an array extending along and laterally-offset from the longitudinal axis of the conveyor, and utilizing a computer-controlled arm carrying an elongate gripping bar having a plurality of spaced-apart grippers to lift, transport and lower the veneer onto the upper surface of a substrate moving on the conveyor.

According to another embodiment of the invention, the method includes the step of programming the computer to direct the robot arm to select from a selected one of the veneer bins a specific length of veneer having a length determined by the computer to position the seam of the substrate at a minimum distance from the end edges of the veneer.

According to another embodiment of the invention, the method includes the steps of providing a computer-controlled arm carrying an elongate gripping bar having a plurality of spaced-apart grippers, removing a veneer from a selected bin with the arm, moving the veneer with the arm laterally into the longitudinal axis of the conveyer at a position above and aligned with the moving substrate, accelerating the aligned veneer with the arm along the longitudinal axis of the conveyor and into a position where the gripping bar lowers the moving veneer into close proximity with a trailing end of a preceding veneer, and lowering the moving veneer onto the moving substrate.

According to another embodiment of the invention, the method includes the step of providing a plurality of computer-controlled vacuum grippers positioned in spaced-apart relation on an elongate gripping bar.

BRIEF DESCRIPTION OF THE DRAWINGS

The present invention is best understood when the following detailed description of the invention is read with reference to the accompanying drawings, in which.

DETAILED DESCRIPTION OF PREFERRED EMBODIMENT AND BEST MODE

Figure 1:
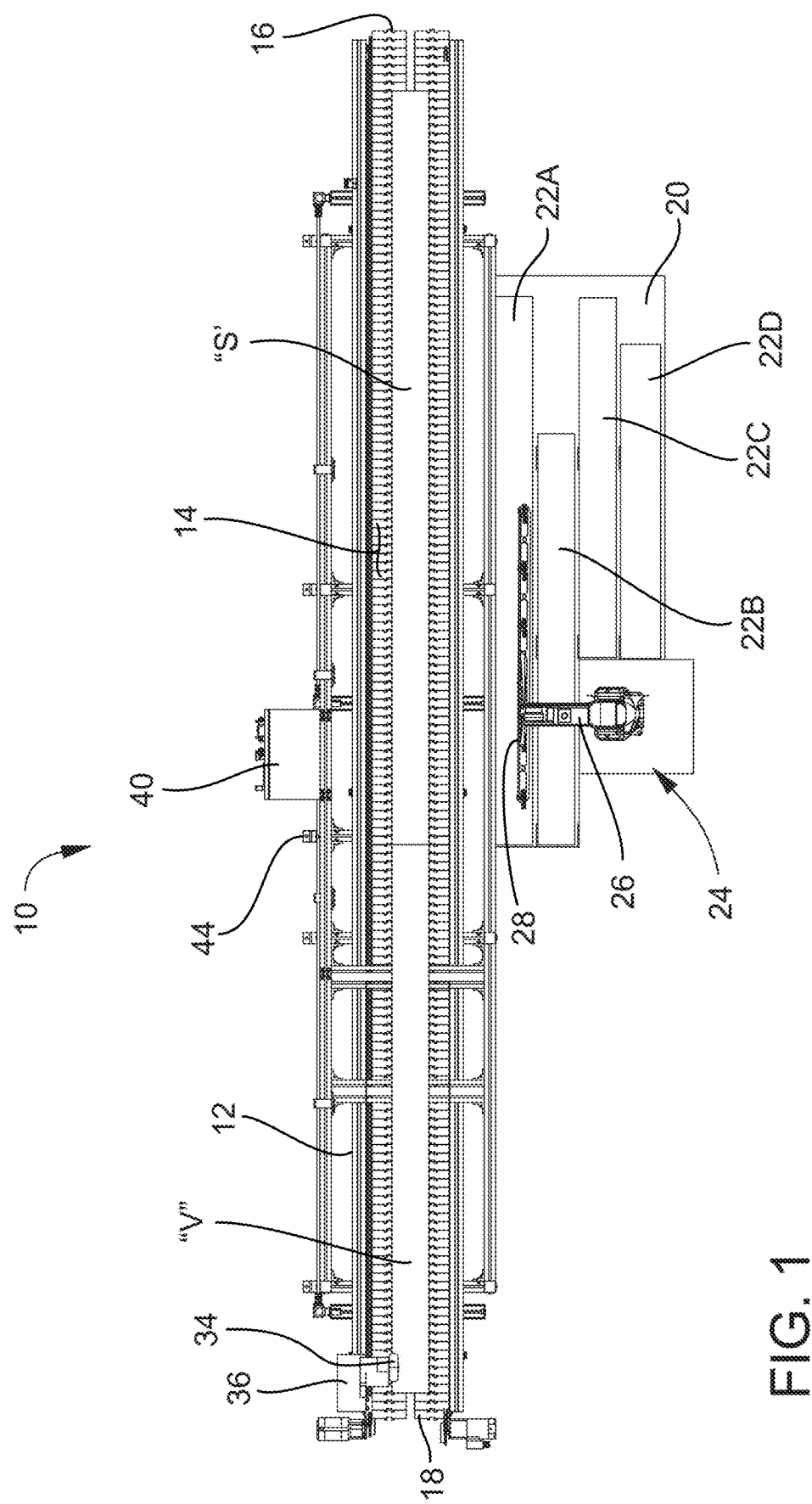
FIG. 1 is a top plan view of one preferred embodiment of an apparatus for automatically positioning laminates such as veneer onto a substrate during manufacture.
Figure 2:
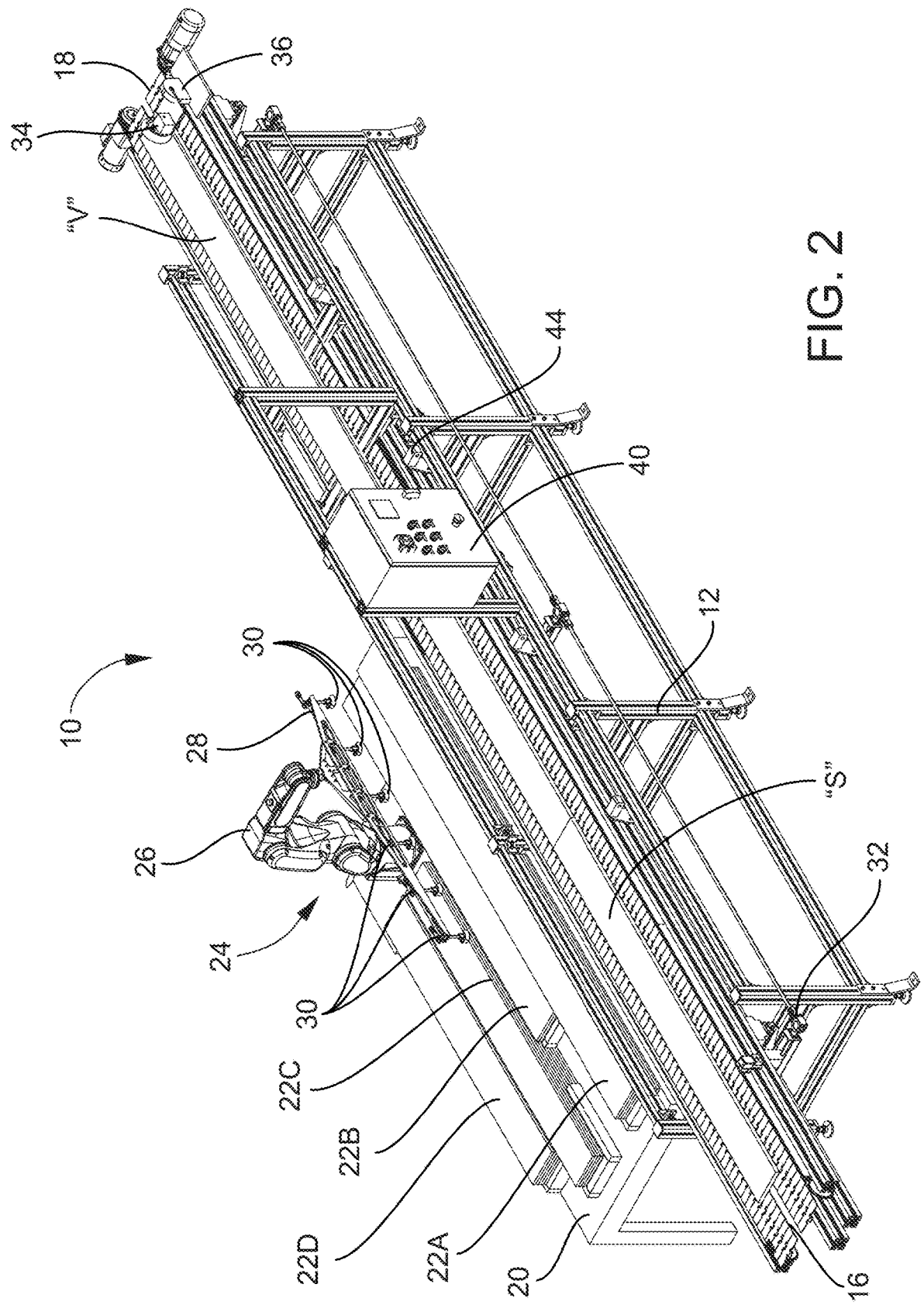
FIG. 2 is a perspective view of the apparatus shown in FIG. 1.

Referring now to the drawings, FIGS. 1 and 2 illustrate one preferred embodiment of the apparatus for automatically positioning laminates such as veneer onto a substrate during manufacture, indicated broadly at reference numeral 10. The apparatus 10 is positioned on an elongate base 12 and includes a conveyor 14 positioned on the base 12 and extending along the base from in infeed end 16 downstream to an outfeed end 18. The conveyor 14 is configured to convey a known, uniform length of substrate "S" along the conveyor 14 from the infeed end 16 to the outfeed end 18 at a predetermined, known rate of travel. At a specified point intermediate the infeed end 16 and the outfeed end 18 a fixed or random length of a veneer "V" is placed onto the traveling substrate "S" according to the process described below.

Figure 3:
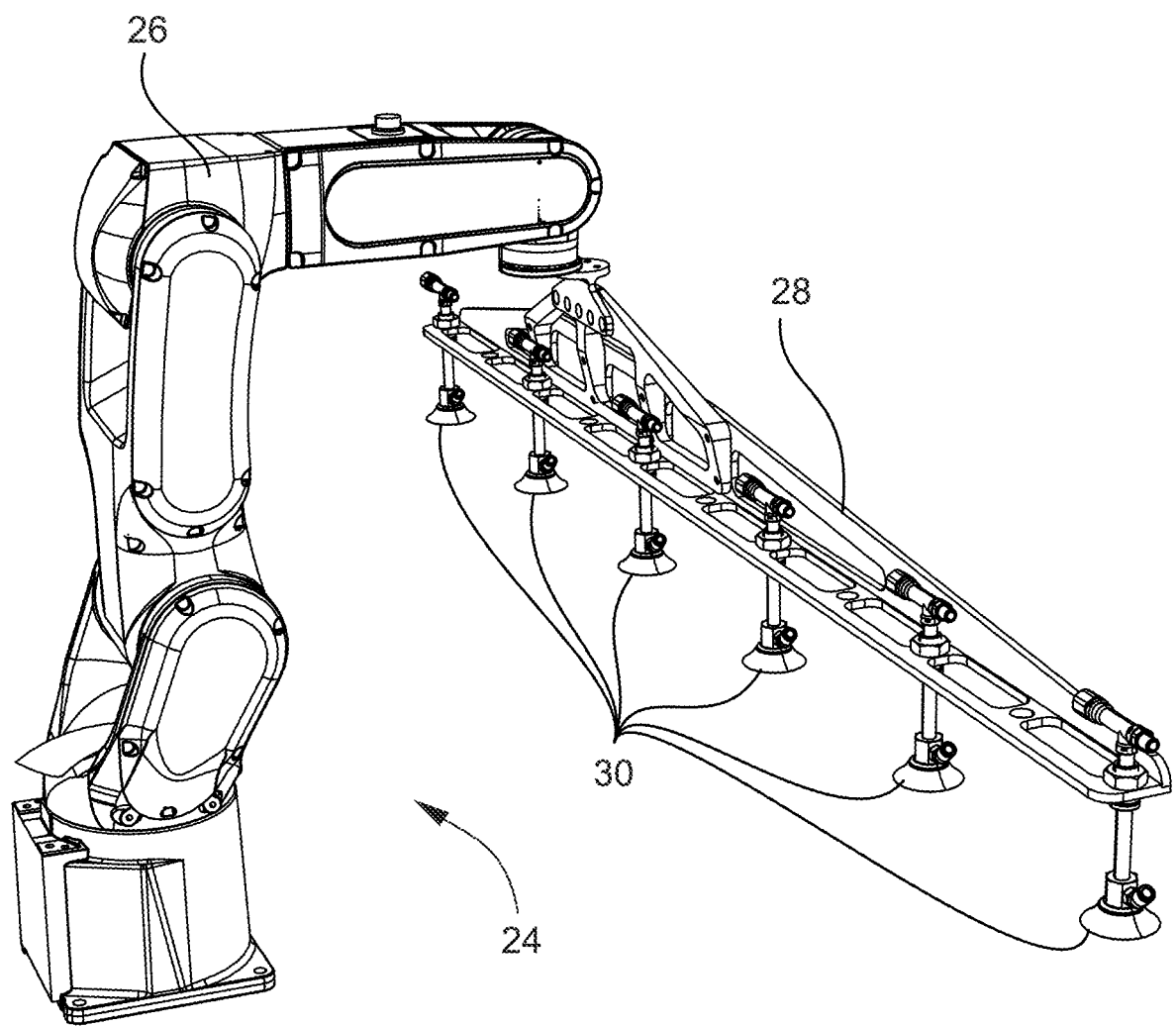
FIG. 3 is a perspective view of the vacuum gripper bar portion of the apparatus shown in FIGS. 1 and 2.
Figure 4:
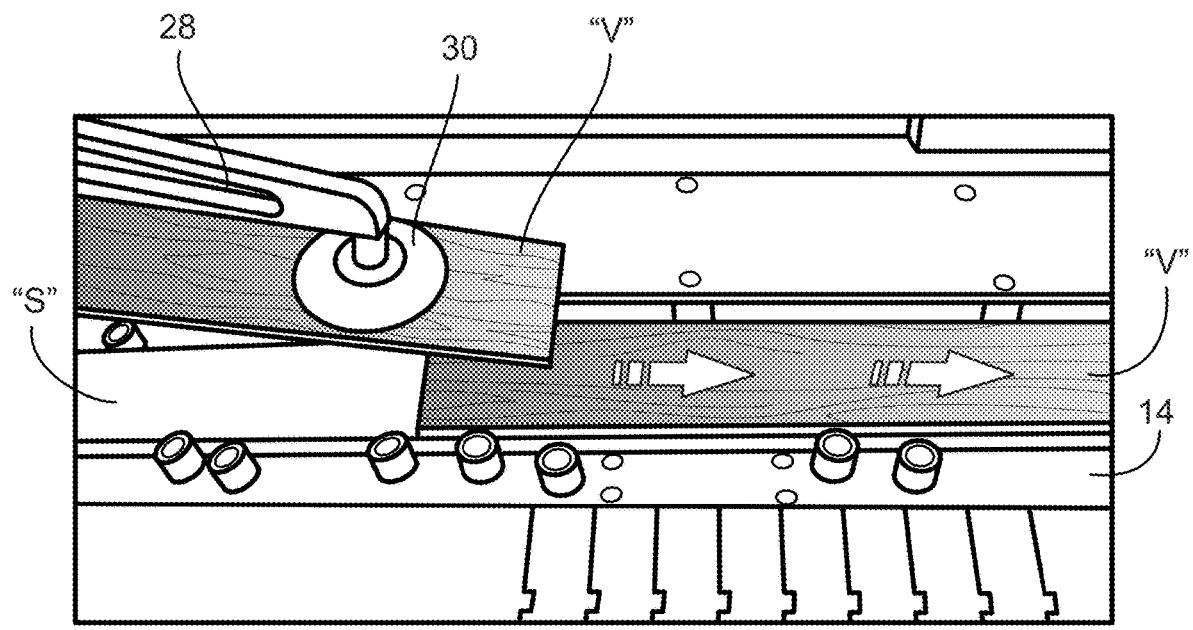
FIGS. 4-7 are sequential fragmentary perspective views of the gripper bar applying a veneer to a moving substrate in accordance with one method of the invention.
Figure 5:
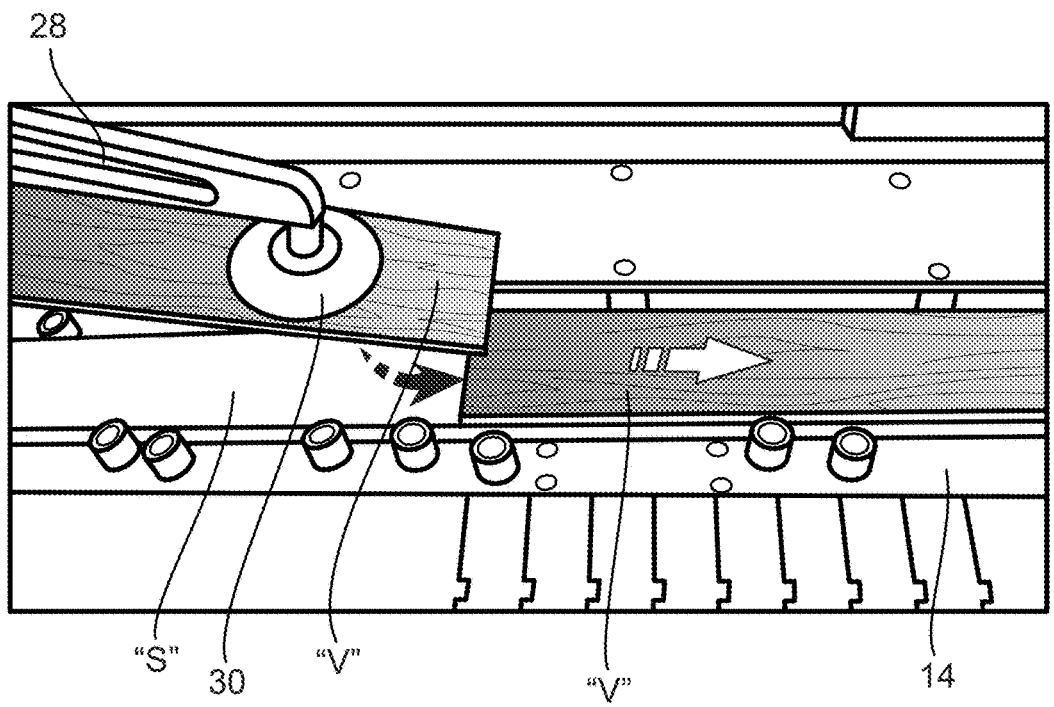
Figure 6:
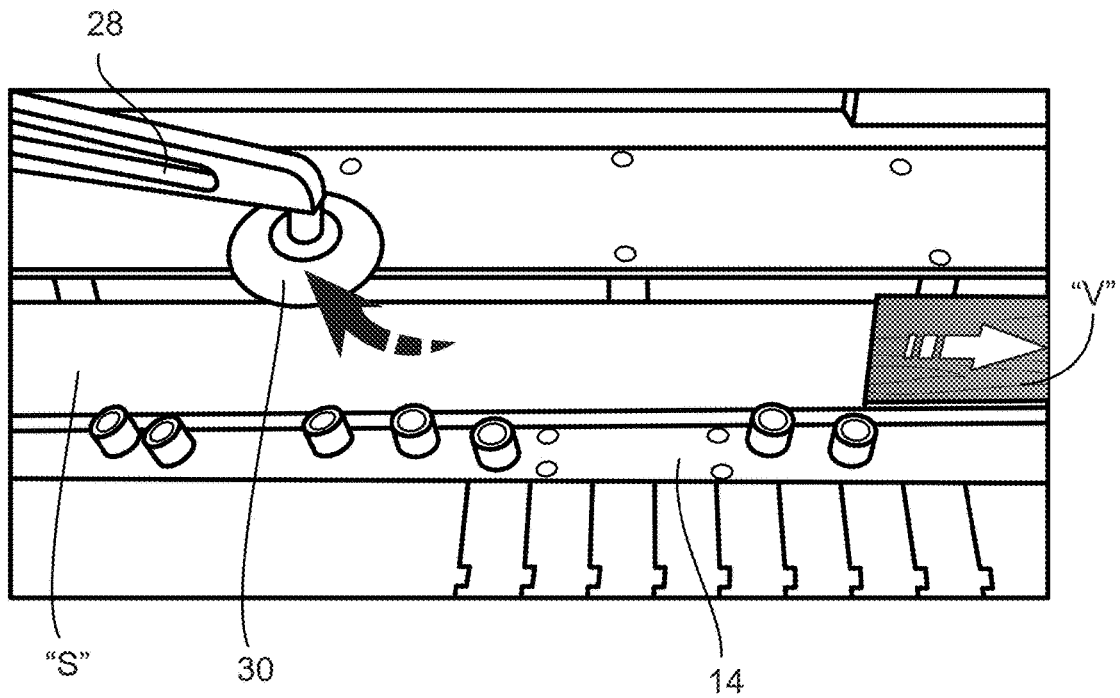
Figure 7:
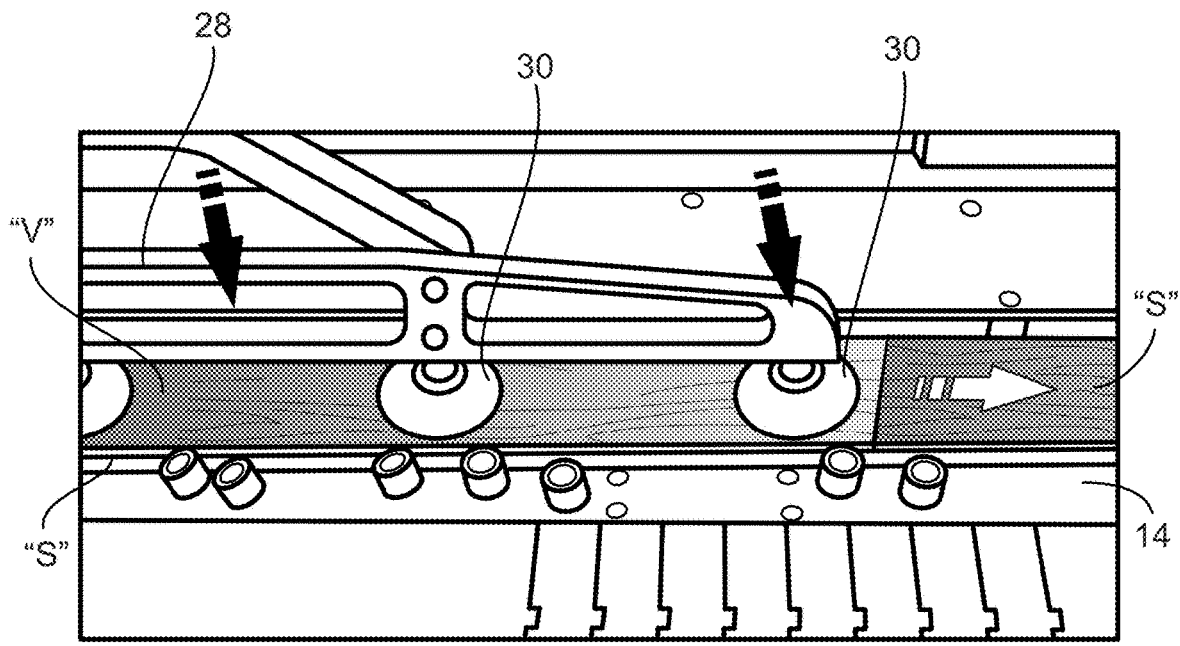

A veneer supply source, for example, a pallet 20, is positioned at a laterally-offset position in relation to the conveyor 14, as shown in both FIGS. 1 and 2. The pallet 20 includes at least one elongate bin 22 adapted for holding a stack of veneers "V." As shown, the particular apparatus 10 shown in FIGS. 1-3 includes 4 bins 22A-22D, each capable of containing a stack of veneers "V" having a desired length. For example, the bins 22A-22D can hold veneers "V" having a length between 2 to 10 ft. (0.6-3 m). In the embodiment shown, the pallet 20 and the bins 22A-22B are aligned with the conveyor 14, but this is not essential, for reasons described below. The number and sizes of the bins 22A-22D can be varied as required. In accordance with one preferred embodiment, the bins 22A-22D have a positive reference location on the left and top edges such that the position of the veneers "V" in an XY plane is known. The length and width of the veneers "V" in each bin is entered in a PLC or other digital computer. The PLC and related components, circuitry, power connections and the like are located in a cabinet 40.

A computer-controlled robot 24 having an articulating 6-axis gripper arm 26 is positioned in relation to the bins 22A-22B to permit removal of single lengths of veneer "V" by the robot 24 from the bins 22A-22B and transport each veneer "V" laterally into the lateral plane of the substrate "S" positioned on and moving along the conveyor 14. A veneer gripping bar 28 is carried on the end of the robot gripper arm 26 and includes several spaced-apart vacuum grippers 30 positioned to be lowered onto the sheets of veneer in the bins 22A-22B, lift a single veneer from a selected one of the bins 22A-22D and transport it laterally to the conveyor 14. The PLC is programmed to select a specific length of veneer "V" from one of the bins 22A-22B based on the calculated location of the trailing end of the substrate "S" and veneer "V."

A camera 32 detects the location of the seam between the trailing and leading edges of the substrates "S" as they pass along the conveyor 14. An encoder 34 is attached either to the substrate drive motor 36 or some other location and communicates with the PLC or other controller to monitor the location of the seams between the substrates "S" as they progress along the length of the conveyor 14.

A laser distance scanner 44 is used to identify the leading end edge of the substrate "S" and the trailing end edge of the veneer "V." The laser distance scanner 44 generates a pulse of laser light directed at the conveyor 14 and measures the time it takes for the reflection to return. The positions of the end edges of the substrate "S" and veneer "V" are determined by the additional amount of time it takes for the laser pulse to return from the conveyor 14 surface as distinct from the top of the substrate "S" and the veneer "V."

The known rate of substrate travel, veneer bin position, seam locations, end edge locations and substrate length is transmitted to the PLC and allows the PLC to optimize and select one of the veneer "V" lengths such that the veneer "V" end edges are offset from the substrate "S" end edges by a preselected large dimension predetermined to be adequate to prevent weak end areas in the finished flooring or other laminated product that result from the end edges of the substrate "S" and the veneer "V" being too close together.

As further explanation, in accordance with this particular preferred embodiment, veneers "V" from 2 to 10 ft. (0.6-3 m) in length are presorted into 2 ft. (0.6 m) increments and placed in separate bins 22A-22D. Substrates "S" with adhesive applied to the top surface are continuously fed either automatically or manually from the infeed end 16 of the conveyor 14, trailing end to leading end, and travel at a constant, known rate along the conveyor 14. Vision camera 32 detects the location of the seam between the trailing and leading edges of the substrates "S." Encoder 34 attached either to the substrate drive motor 36 or other location is used along with the PLC to monitor the location of the substrate "S" seams as they move downstream on the conveyor 14 towards the outfeed end 18. This information is conveyed via the PLC to the robot 24 and is used to control the articulating gripper arm 26 of the robot 24 and to determine which length of the several lengths of veneer "V" is optimal for being married to the substrate "S" with a predetermined minimum distance between the seam between two adjacent substrates "S" and two adjacent veneers "V."

The vacuum grippers 30 are manipulated by the articulating gripper arm 26 to the selected one of the bins 22A-22D and the top veneer "V" is picked up by the vacuum grippers 30 on the end of the gripper arm 26. The gripper arm 26 then performs a compound motion that lifts the selected veneer "V" clear of the selected one of the bins 22A-22D in which it resided, translates the veneer "V" laterally from the bin position into a position where the veneer "V" is above and in the same lateral plane as the moving substrate "S." The gripper arm 26 then simultaneously articulates to maintain alignment with the lateral plane of the substrate "S" and accelerates along the direction of travel of the substrate "S" until the veneer "V" "catches up" with the substrate "S" and is traveling at the same rate. The gripper arm 26 then lowers the veneer "V" onto the substrate "S" while continuing at the same rate of travel and places the leading edge of the veneer "V" directly in contact with the trailing edge of the moving substrate "S" and the bottom surface of the veneer "V" onto and in contact with the top surface of the substrate "S." The mated substrate "S" and veneer "V" proceed off of the outfeed end 18 of the conveyor 14 and onto another conveyor, not shown, where they are passed between pinch rolls to firmly secure the substrate "S" and the veneer "V." The six-axis articulation of the gripper arm 26 enables the veneer gripping bar 28 to remove individual lengths of veneer "V" from the bins 22A-22D without regard to the orientation of the bins 22A-22D in relation to the orientation of the conveyor 14.

This process may also be used for composing laminated wood products where the composing conveyor transfers the substrate "S" in a lateral instead of a linear direction. In cases such as in the lamination of door stiles and rails, the substrates "S" as well as the veneers "V" are of the same but varying lengths and thicknesses. The vision camera 32 is deployed to measure the length of the substrate "S" and the laser distance scanner 44 measures the thickness of the substrate "S" as it indexes through the composing conveyor 14. The PLC selects the proper length veneer "V" for the substrate "S" and the robot 24 and grippers 30 transfer and place the selected veneer "V" onto the top surface of the substrate "S."

FIGS. 4, 5, 6 and 7 illustrate the description above where the gripper arm 26 maneuvers the veneers "V" onto the top surface of the moving substrate "S."

Figure 8:
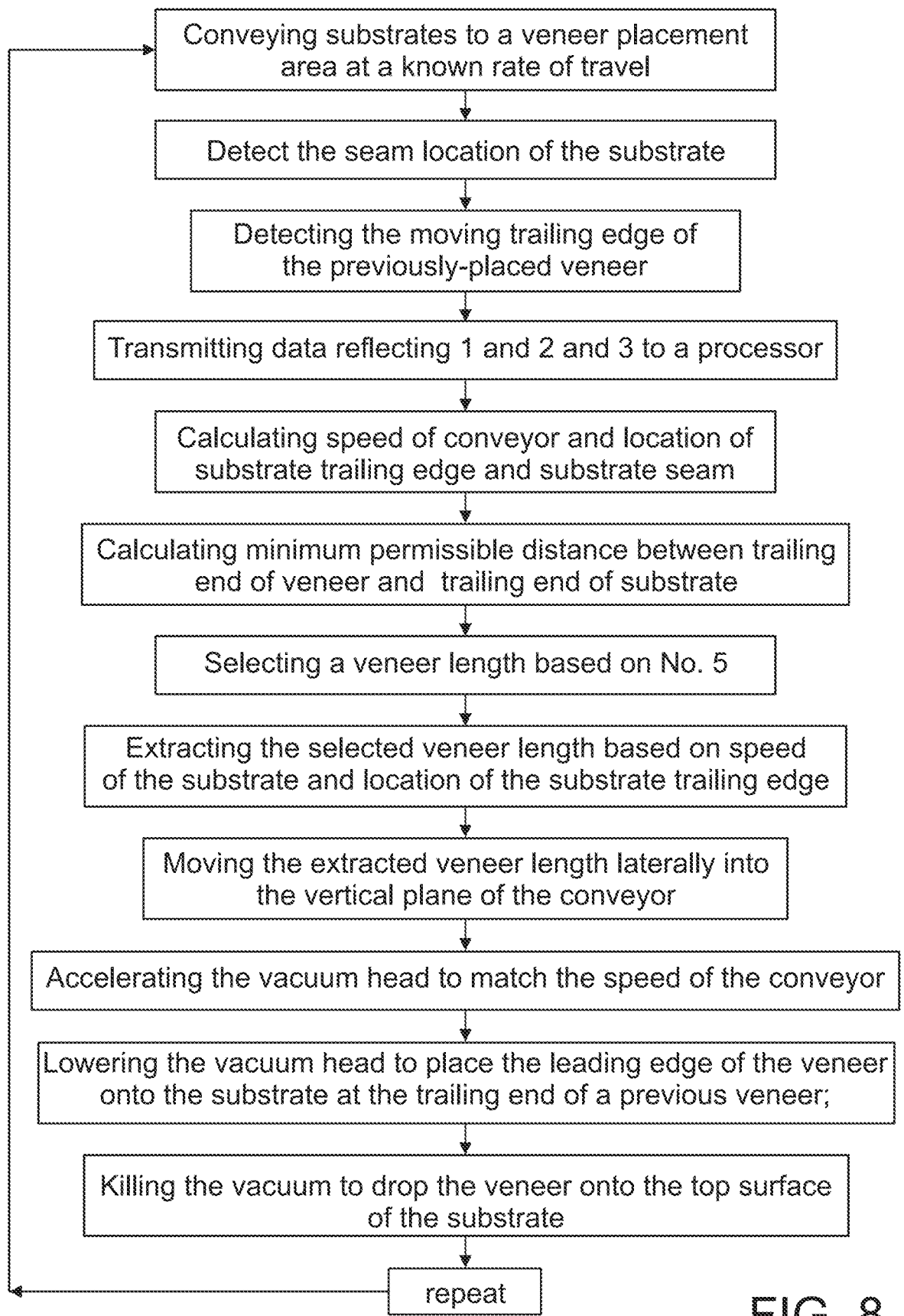
FIG. 8 is a listing of method steps in accordance with one preferred embodiment of the invention.

A summary of the process steps according to one preferred method is set out below and illustrated diagrammatically in FIG. 8:

1. Conveying substrates to a veneer placement area at a known rate of travel;
2. Detect the seam location of the substrate;
3. Detecting the moving trailing edge of the previously-placed veneer;
4. Transmitting data reflecting 1 and 2 and 3 to a processor;
5. Calculating speed of conveyor and location of substrate trailing edge and substrate seam;
6. Calculating minimum permissible distance between trailing end of veneer and trailing end of substrate;
7. Selecting a veneer length based on Nos. 5 and 6;
8. Extracting the selected veneer length based on speed of the substrate and location of the substrate trailing edge;
9. Moving the extracted veneer length laterally into the vertical plane of the conveyor;
10. Accelerating the vacuum head to match the speed of the conveyor;
11. Lowering the vacuum head to place the leading edge of the veneer onto the substrate at the trailing end of a previous veneer;
12. Discontinuing the vacuum to drop the veneer onto the top surface of the substrate;
13. Repeat Nos. 1-12.

A computer-based apparatus and method for automatically selecting and positioning laminates such as veneer during a composing process prior to laminating wood products according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. An apparatus for forming a laminated product by positioning a veneer onto a substrate while the substrate is positioned on a continuously-moving conveyor; comprising:
    a. an elongate conveyor having an infeed end, a downstream outfeed end and adapted for moving successive known lengths of substrates having an upper surface carrying an adhesive along a longitudinal axis from the infeed end to the outfeed end at a known rate;
    b. at least one veneer supply source positioned in a known location laterally offset from the longitudinal axis of the conveyor for supplying successive lengths of veneer to be applied onto the top surface of the continuously-moving lengths of substrate, wherein the veneer supply source comprises a plurality of elongate bins sized to hold veneers of varying specific lengths positioned in an array extending along and laterally-offset from the longitudinal axis of the conveyor, and the robot includes a computer-controlled arm carrying an elongate gripping bar having a plurality of spaced-apart grippers adapted to lift, transport and lower the veneer;
    c. a seam location sensor for determining the location of a seam between successive lengths of the substrate continuously-moving downstream;
    d. an end edge sensor for determining the location of end edges of the moving lengths of substrate and veneer;
    e. a location monitor for monitoring the location of the seams and end edges of the moving lengths of substrate and veneer as they continuously-move along the conveyor;
    f. a computer programmed to calculate a moving position of a trailing end edge of the substrate continuously-moving on the conveyor based on inputs from the seam location sensor, end edge sensor and location monitor and to determine an appropriate length of veneer necessary to position the seam of the substrate at a minimum distance from the end edges of the veneer; and
    g. a robot operatively connected to the computer and adapted to remove from the veneer supply source a veneer having a length determined by the computer to position the seam of the substrate at a minimum distance from the end edges of the veneer, laterally transport the veneer into the longitudinal axis of the continuously-moving conveyor, apply a leading edge of the veneer to a trailing edge of a preceding veneer and lower the veneer onto an upper surface of the moving substrate.

2. The apparatus according to claim 1, wherein the robot includes a computer-controlled arm carrying an elongate gripping bar having a plurality of spaced-apart vacuum grippers programmed to utilize vacuum pressure to lift, transport and lower the veneer.

3. The apparatus according to claim 1, wherein the seam location sensor includes a vision camera having a data output to the computer.

4. The apparatus according to claim 1, wherein the end edge sensor includes a laser scanner having a data output to the computer.

5. The apparatus according to claim 1, wherein the location monitor includes an encoder having a data output to the computer.

6. The apparatus according to claim 1, wherein the computer is adapted to be programmed to direct the robot arm to select from a selected one of the veneer bins a specific length of veneer having a length determined by the computer to position the seam of the substrate at a minimum distance from the end edges of the veneer.

7. The apparatus according to claim 6, wherein the robot comprises a computer-controlled arm carrying an elongate gripping bar having a plurality of spaced-apart grippers adapted to:
    a. remove a veneer from a selected bin;
    b. move the veneer laterally into the longitudinal axis of the conveyer at a position above and aligned with the moving substrate;
    c. accelerate the aligned veneer along the longitudinal axis of the conveyor and into a position where the gripping bar lowers the moving veneer into close proximity with a trailing end of a preceding veneer; and
    d. lower the moving veneer onto the moving substrate.

8. The apparatus according to claim 6, and further wherein the computer is adapted to be programmed to direct the robot arm to select from one of the veneer bins a specific length of veneer having a length determined by the computer to position the seam of the substrate at a minimum distance from the end edges of the veneer.

9. A method of fabricating laminated wood products by positioning a veneer onto a substrate while on a continuously-moving conveyor; comprising the steps of:
   a. providing an elongate conveyor having an infeed end, a downstream outfeed end and adapted for moving successive known lengths of substrates having an upper surface carrying an adhesive along a longitudinal axis from the infeed end to the outfeed end at a known rate;
   b. providing at least one veneer supply source positioned in a known location laterally offset from the longitudinal axis of the conveyor for supplying successive lengths of veneer to be applied onto a top surface of the moving lengths of substrate, wherein the step of supplying at least one veneer supply source comprises providing a plurality of elongate bins sized to hold veneers of varying specific lengths positioned in an array extending along and laterally-offset from the longitudinal axis of the conveyor, and utilizing a computer-controlled arm carrying an elongate gripping bar having a plurality of spaced-apart grippers to lift, transport and lower the veneer onto the upper surface of a substrate moving on the conveyor;
   c. determining the location of a seam between successive lengths of the substrate moving downstream;
   d. determining the location of end edges of the moving lengths of substrate and veneer;
   e. monitoring the location of the seams and end edges as they move along the conveyor;
   f. programming a computer to calculate a moving position of a trailing end edge of a substrate moving on the conveyor based on inputs from the seam location sensor, end edge sensor and location monitor and determine an appropriate length of veneer necessary to position the seam of the substrate at a minimum distance from the end edges of the veneer;
   g. providing a robot operatively connected to the computer;
   h. removing from the veneer supply source with the robot a veneer having a length determined by the computer to position the seam of the substrate at a minimum distance from the end edges of the veneer,
   i. laterally transporting the veneer with the robot into the longitudinal axis of the conveyor;
   j. applying a leading edge of the veneer with the robot to a trailing edge of a preceding veneer; and
   k. lowering the veneer with the robot onto an upper surface of the substrate.

10. The method according to claim 9, and including the step of utilizing vacuum pressure to lift, transport and lower the veneer.

11. The method according to claim 9, and including the step of programming the computer to direct the robot arm to select from a selected one of the veneer bins a specific length of veneer having a length determined by the computer to position the seam of the substrate at a minimum distance from the end edges of the veneer.

12. The method according to claim 9, and including the steps of:
   a. providing a computer-controlled arm carrying an elongate gripping bar having a plurality of spaced-apart grippers;
   b. removing a veneer from a selected bin with the arm;
   c. moving the veneer with the arm laterally into the longitudinal axis of the conveyer at a position above and aligned with the moving substrate;
   d. accelerating the aligned veneer with the arm along the longitudinal axis of the conveyor and into a position where the gripping bar lowers the moving veneer into close proximity with a trailing end of a preceding veneer; and
   e. lowering the moving veneer onto the moving substrate.

13. The method according to claim 10 and including the step of providing a plurality of computer controlled vacuum grippers positioned in spaced-apart relation on an elongate gripping bar.

* * * * *